United States Patent
Witlicki et al.

(10) Patent No.: US 10,138,757 B2
(45) Date of Patent: Nov. 27, 2018

(54) BEARING SYSTEM FOR GAS TURBINE ENGINE

(71) Applicant: United Technologies Corporation, Hartford, CT (US)

(72) Inventors: Russell B. Witlicki, Wethersfield, CT (US); Armando Amador, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 313 days.

(21) Appl. No.: 14/910,829

(22) PCT Filed: Aug. 18, 2014

(86) PCT No.: PCT/US2014/051486
§ 371 (c)(1),
(2) Date: Feb. 8, 2016

(87) PCT Pub. No.: WO2015/069353
PCT Pub. Date: May 14, 2015

(65) Prior Publication Data
US 2016/0186607 A1   Jun. 30, 2016

Related U.S. Application Data

(60) Provisional application No. 61/867,905, filed on Aug. 20, 2013.

(51) Int. Cl.
| | | |
|---|---|---|
| *F01D 25/04* | (2006.01) | |
| *F01D 25/16* | (2006.01) | |
| *F01D 25/28* | (2006.01) | |
| *F16C 27/04* | (2006.01) | |
| *F16C 19/26* | (2006.01) | |

(52) U.S. Cl.
CPC .......... *F01D 25/164* (2013.01); *F01D 25/04* (2013.01); *F01D 25/28* (2013.01); *F16C 27/045* (2013.01); *F05D 2220/32* (2013.01); *F05D 2240/60* (2013.01); *F05D 2260/96* (2013.01); *F16C 19/26* (2013.01); *F16C 2360/23* (2013.01); *Y02T 50/671* (2013.01)

(58) Field of Classification Search
CPC ..... F01D 25/04; F01D 25/164; F05D 2260/96
See application file for complete search history.

(56) References Cited

U.S. PATENT DOCUMENTS

| | | | | |
|---|---|---|---|---|
| 3,005,668 | A | * | 10/1961 | Szydlowski .......... F01D 25/164 384/535 |
| 4,214,796 | A | | 7/1980 | Monzel et al. |
| 4,453,783 | A | | 6/1984 | Davis et al. |
| 4,457,667 | A | | 7/1984 | Seibert et al. |
| 5,161,940 | A | * | 11/1992 | Newland ............... F01D 25/164 415/142 |

(Continued)

OTHER PUBLICATIONS

Extended EP Search Report dated Aug. 9, 2016.

*Primary Examiner* — Ninh H Nguyen
(74) *Attorney, Agent, or Firm* — O'Shea Getz P.C.

(57) ABSTRACT

A bearing system is provided for a gas turbine engine. This bearing system includes a spring defined about an axis of rotation. The spring has a multiple of beams which extend between a flange and a damper attachment. A damper defined about the axis of rotation and mounted to the spring to at least partially axially overlap the multiple of beams.

14 Claims, 8 Drawing Sheets

(56) References Cited

U.S. PATENT DOCUMENTS

| | | | | |
|---|---|---|---|---|
| 5,862,706 A | * | 1/1999 | Chen | F16H 1/48 |
| | | | | 384/536 |
| 6,443,698 B1 | | 9/2002 | Corattiyil et al. | |
| 8,182,156 B2 | * | 5/2012 | Kinnaird | F01D 25/164 |
| | | | | 384/535 |
| 2004/0115041 A1 | | 6/2004 | Scardicchio et al. | |
| 2008/0152483 A1 | * | 6/2008 | Godleski | F01D 25/164 |
| | | | | 415/142 |
| 2010/0027930 A1 | | 2/2010 | Kinnaird et al. | |
| 2010/0220948 A1 | | 9/2010 | Singh et al. | |
| 2012/0189429 A1 | | 7/2012 | Witlicki | |
| 2013/0051982 A1 | | 2/2013 | Hindle et al. | |
| 2013/0078079 A1 | | 3/2013 | Lapierre et al. | |

* cited by examiner

BEARING SYSTEM FOR GAS TURBINE ENGINE

CROSS-REFERENCE TO RELATED APPLICATION

This application claims priority to PCT Patent Application No. PCT/US2014/051486 filed Aug. 18, 2014, which claims priority to U.S. Patent Appln. Ser. No. 61/867,905 filed Aug. 20, 2013, each of which is hereby incorporated herein by reference in its entirety.

BACKGROUND

The present disclosure relates to a gas turbine engine, and in particular, to a sprung and damped bearing system for a gas turbine engine rotor assembly.

Gas turbine engines typically include one or more rotor shafts that transfer power and rotary motion from a turbine section to a compressor and fan section. Each rotor shaft is supported by a plurality of bearing systems.

Rotor dynamics require some bearing systems to be sprung and damped. The spring is typically a series of beams arranged in a cage-like structure to provide particular rotor dynamic stiffness requirements while the damper minimizes the transfer of vibrational forces from the bearing assembly into static structure. Engine arrangement configurations, clearance requirements, geometric tolerance, thermal growth considerations and the location of the bearing compartment define a bearing compartment axial length which, in a turbine section, typically affects a turbine disk bore dimension and the weight thereof.

SUMMARY

A bearing system for a gas turbine engine, according to one disclosed non-limiting embodiment of the present disclosure, includes a spring defined about an axis. The spring includes a multiple of beams that extend between a radial flange and a damper attachment and a damper defined about the axis. The damper is fastened to the damper attachment and nested within the spring.

In a further embodiment of the present disclosure, a multiple of fasteners are include that mount the spring to the damper at the damper attachment.

In a further embodiment of any of the foregoing embodiments of the present disclosure, the spring is welded to the damper at the damper attachment.

In a further embodiment of any of the foregoing embodiments of the present disclosure, the radial flange extends radially outboard with respect to the axis.

In a further embodiment of any of the foregoing embodiments of the present disclosure, the damper attachment extends radially inboard with respect to the axis of rotation.

In a further embodiment of any of the foregoing embodiments of the present disclosure, the damper defines a bearing support section radially inboard of the radial flange.

In a further embodiment of any of the foregoing embodiments of the present disclosure, the damper at least partially axially overlaps the multiple of beams.

In a further embodiment of any of the foregoing embodiments of the present disclosure, a bearing is included and mounted to the damper.

In a further embodiment of any of the foregoing embodiments of the present disclosure, a bearing element of the bearing is axially aligned with the radial flange.

A gas turbine engine, according to another disclosed non-limiting embodiment of the present disclosure, includes a spring defined about the axis. The spring includes a multiple of beams that extend between a radial flange and a damper attachment. The radial flange is mounted to a static structure. A damper is defined about the axis. The damper is fastened to the damper attachment and nested within the spring. A bearing is mounted between the damper and a rotor shaft to rotationally support the rotor shaft.

In a further embodiment of any of the foregoing embodiments of the present disclosure, the damper defines a bearing support section radially inboard of the radial flange.

In a further embodiment of any of the foregoing embodiments of the present disclosure, the static structure includes a radial wall with an axial flange. The radial flange mounted to the radial wall.

In a further embodiment of any of the foregoing embodiments of the present disclosure, a bearing element of the bearing is axially aligned with the radial flange.

In a further embodiment of any of the foregoing embodiments of the present disclosure, the axial flange extends between the spring and the damper.

In a further embodiment of any of the foregoing embodiments of the present disclosure, a multiple of fasteners are included that mount the damper to the spring at the damper attachment. The multiple of fasteners are mounted into a distal end of the damper.

In a further embodiment of any of the foregoing embodiments of the present disclosure, the damper attachment and the spring define an interference fit.

In a further embodiment of any of the foregoing embodiments of the present disclosure, the radial flange extends radially outboard with respect to the axis.

In a further embodiment of any of the foregoing embodiments of the present disclosure, the damper attachment extends radially inboard with respect to the axis of rotation.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
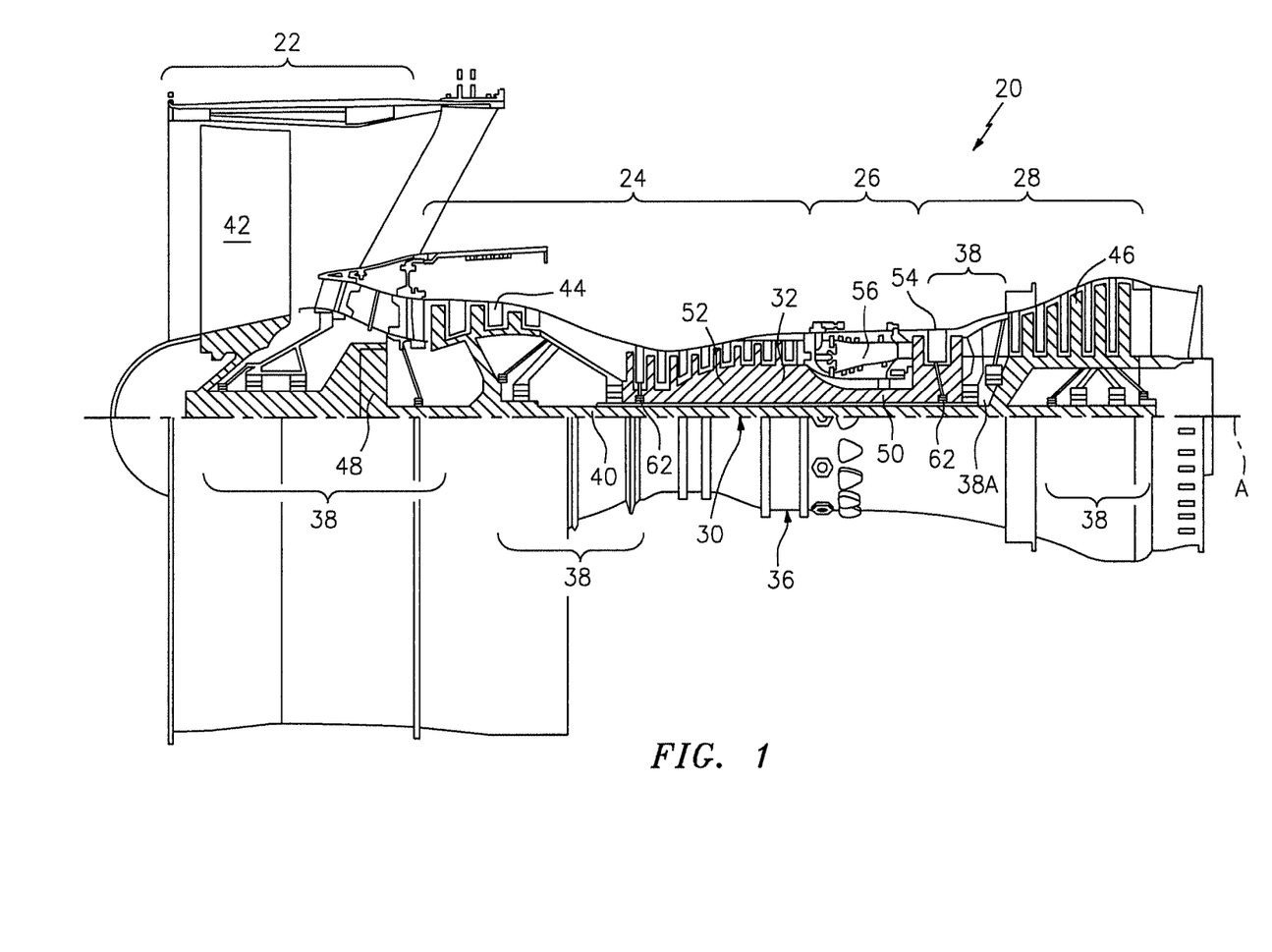
FIG. 1 is a schematic cross-section of a gas turbine engine, according to a non-limiting embodiment.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three spool (plus fan) turbofans wherein the three spools include an intermediate spool includes an intermediate pressure compressor ("IPC") between a Low Pressure Compressor ("LPC") and a High Pressure Compressor ("HPC"), and an Intermediate Pressure Turbine ("IPT") between a High Pressure Turbine ("HPT") and a Low Pressure Turbine ("LPT").

The gas turbine engine 20 generally includes a low spool 30 and a high spool 32 mounted for rotation about an engine central longitudinal axis A relative to an engine static structure 36 via two or more bearing systems such as the bearing systems 38A. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. In an embodiment, the reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear therewith.

Core airflow is compressed by the LPC 44 then the HPC 52, mixed with fuel and burned in the combustor 56, then expanded over the HPT 54 and the LPT 46. The HPT 54, and LPT 46 rotationally drive the respective high spool 32 and low spool 30 in response to the expansion. The main engine shafts 40, 50 are supported at a plurality of points by bearing systems 38 within the static structure 36. It should be understood that various bearing systems 38 at various locations may alternatively or additionally be provided.

In one non-limiting example, the gas turbine engine 20 is a high-bypass geared aircraft engine with a bypass ratio greater than about six (6:1). The geared architecture 48 can include an epicyclic gear system, such as a planetary, star or other gear system. One example epicyclic gear system has a gear reduction ratio greater than about 2.3, and in another example greater than about 2.5:1. The geared turbofan enables operation of the low spool 30 at higher speeds which can increase the operational efficiency of the LPC 44 and LPT 46 to render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one example, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, turbojets and others.

A significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one example is less than 1.45. Low Corrected Fan Tip Speed is the actual fan tip speed divided by an industry standard temperature correction of ("Tram"/518.7)0.5. The Low Corrected Fan Tip Speed of one example gas turbine engine 20 is less than about 1150 fps (351 m/s).

One example bearing system 38 is the #4 bearing system 38A located within the turbine section 28. Rotor dynamics requires that the #4 high speed rotor bearing system be sprung and damped.

Figure 2:
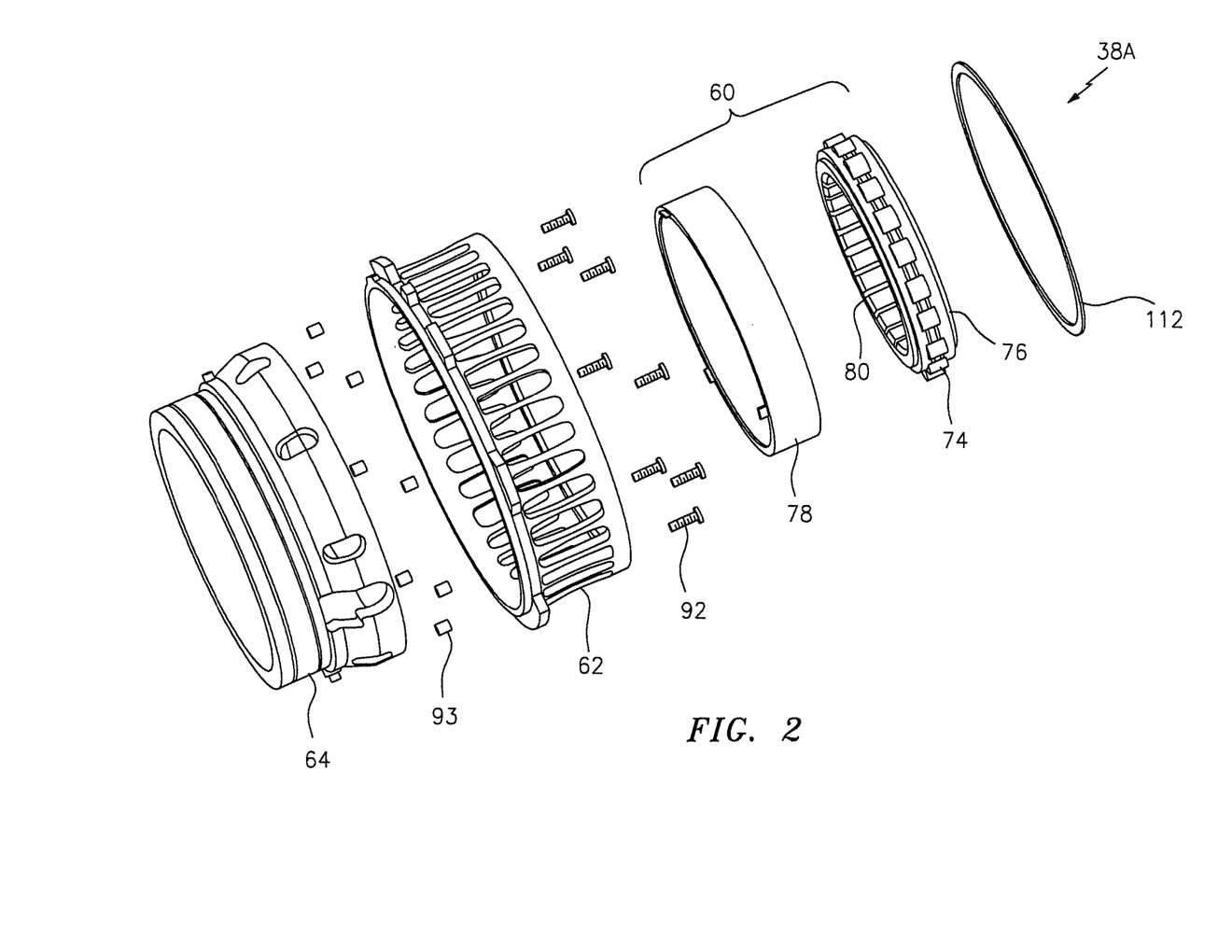
FIG. 2 is an exploded view of a bearing system according to one disclosed non-limiting embodiment.

With reference to FIG. 2, the bearing system 38A generally includes a bearing 60, a spring 62, and a damper 64. It should be appreciated that although the bearing system 38A is disclosed adjacent to the LPT 46 various other bearing systems in this and other engine architectures will also benefit herefrom.

The bearing 60 generally includes a plurality of rolling elements 74, a cage 76, an outer race 78 and an inner race 80. Each rolling element 74 is located in rolling contact between the inner race 80 and the outer race 78 and are spaced circumferentially by the cage 76. It should be appreciated that various bearings with various rolling elements such as rollers, balls, pins and others may be utilized with and benefit from the spring 62 and damper 64.

Figure 3:
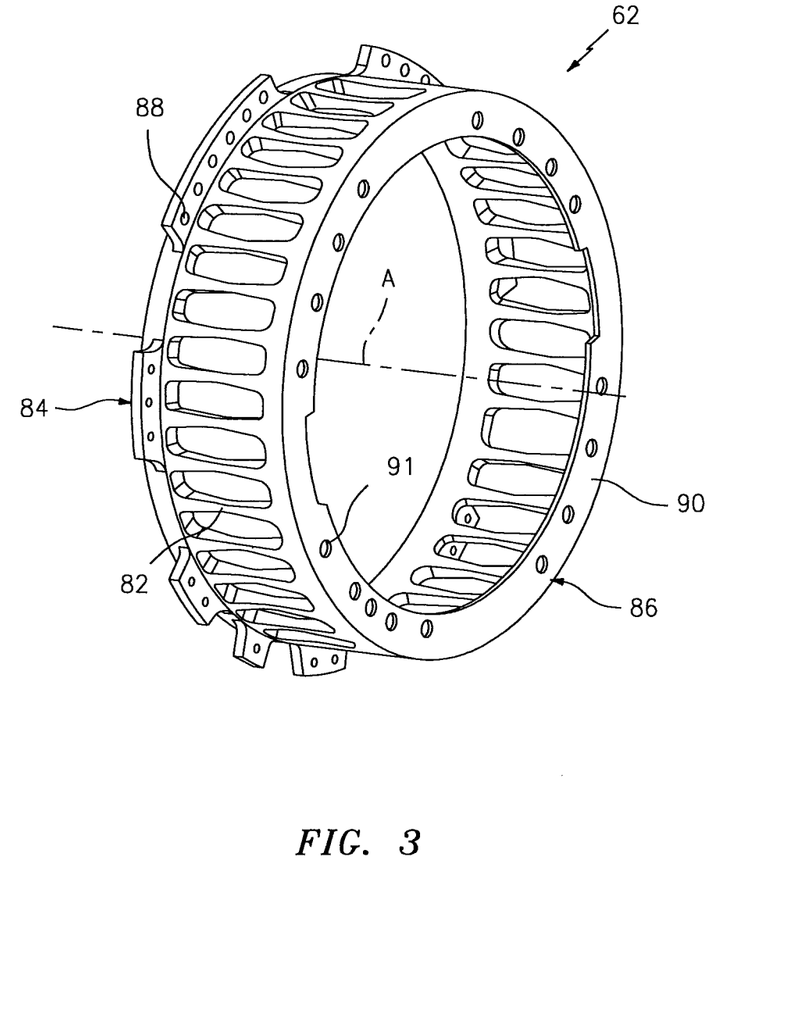
FIG. 3 is an enlarged perspective view of a spring for the bearing system, according to a non-limiting embodiment.

With reference to FIG. 3, the spring 62 is a generally cylindrical or cylindrically tapered cage-like structural component with a multiple of beams 82 that extend between a radial flange 84 and a damper attachment 86. It should be appreciated that the spring 62 may be of various alternative configurations. The beams 82 may be double-tapered beams arrayed circumferentially to control a radial spring rate selected based on a plurality of considerations to include, but not be limited to, bearing loading, bearing life, rotor dynamics, and rotor deflection considerations. The radial flange 84 extends radially outboard with respect to the engine axis A and includes a multiple of apertures 88 to mount the spring 62 to engine static structure. The damper attachment 86 includes a radial flange 90 that extends radially inboard with respect to the engine axis A and includes a multiple of apertures 91 to mount the spring 62 thereto. It should be appreciated that the flange arrangement may be reversed or include various other geometries.

Figure 4:
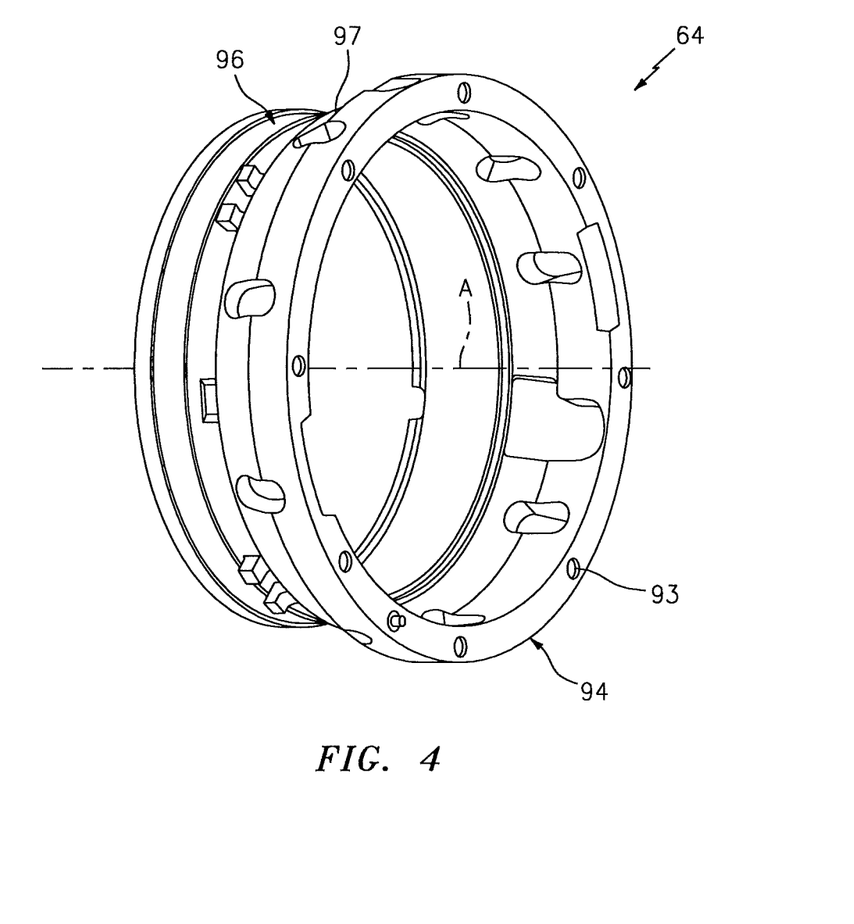
FIG. 4 is an enlarged perspective view of a damper for the bearing system, according to a non-limiting embodiment.
Figure 5:
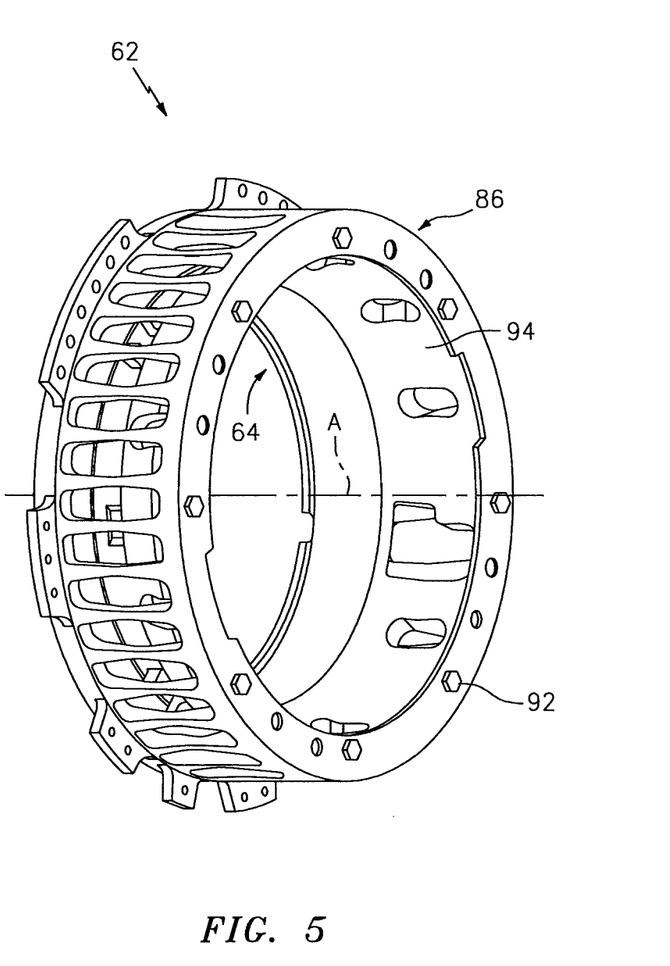
FIG. 5 is an enlarged perspective view of the spring of FIG. 3 mounted to the damper of FIG. 4, according to a non-limiting embodiment.

With reference to FIG. 4, the damper 64 is a generally cylindrical member that nests radially within the spring 62 (see FIG. 5). The damper 64 includes an axial end section 94 and a bearing support section 96 with a center section 97 therebetween. The axial end section 94 of the damper 64 may include threaded inserts 93, or machined threads to facilitate maintenance, etc. The bearing support section 96 is opposite the axial end section 94 of the damper 64 but may be radially displaced. In the disclosed non-limiting embodiment, the bearing support section 96 is radially inboard of the axial end section 94. The center section 97 may further facilitate stiffness adjustment in addition to that provided by the spring 62 through inclusion of additional features, such as beam-like structures, thickness modification, or other features. That is, the center section 97 of the damper 64 may be utilized as a secondary spring.

Figure 6:
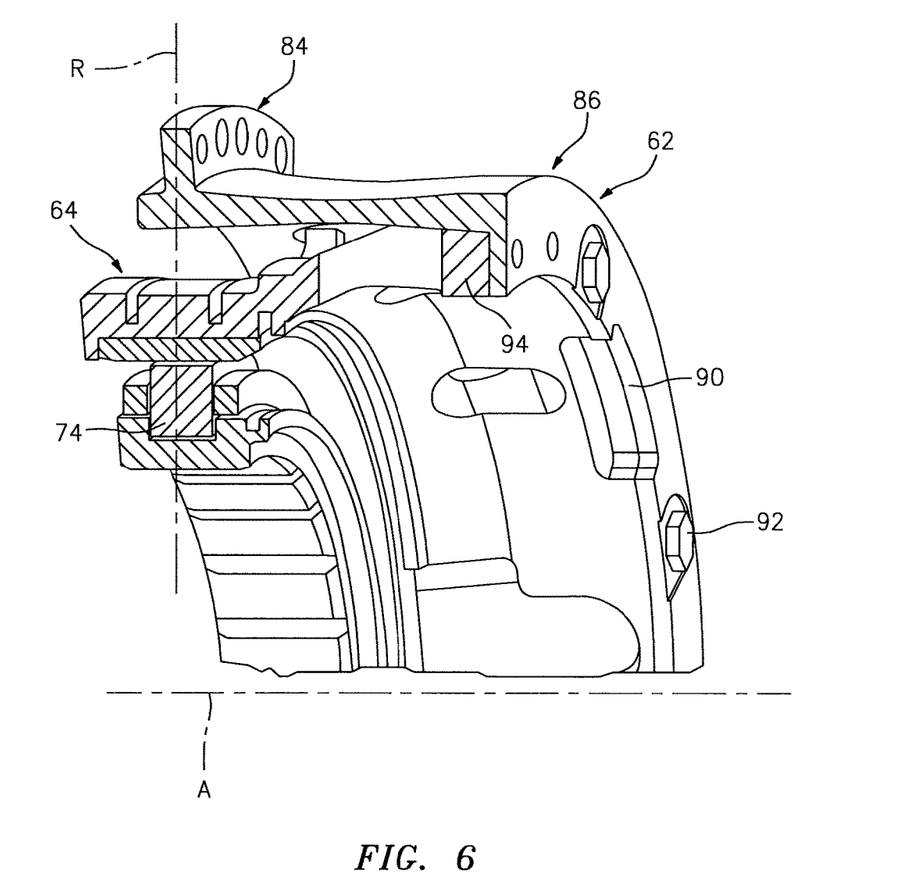
FIG. 6 is an enlarged sectional view of the spring and damper, according to a non-limiting embodiment.

With reference to FIG. 5, the damper attachment 86 receives a respective multiple of fasteners 92 into the axial end section 94 of the damper 64 such that the bearing support section 96 of the damper 64, the radial flange 84 and the rolling elements 74 are axially aligned along an axis R (see FIG. 6). It should be further appreciated that other interfaces such as bolting, welding, etc., may alternatively or additionally be utilized. The nested configuration may further include an interference fit between the damper attachment 86 and the axial end section 94 of the damper 64.

Figure 7:
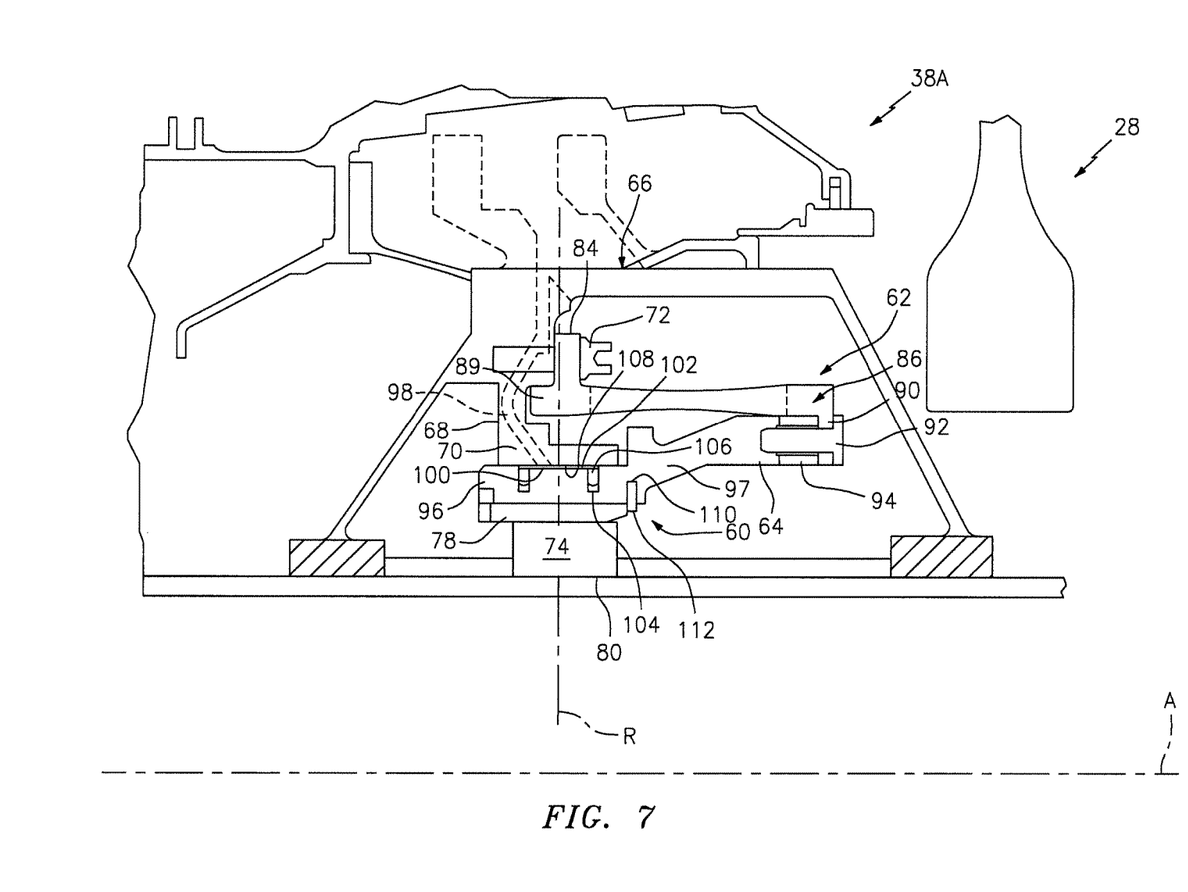
FIG. 7 is an enlarged sectional view of a section of the gas turbine engine that illustrates the bearing system according to one disclosed non-limiting embodiment.

With reference to FIG. 7, in a disclosed non-limiting embodiment, the spring 62 is mounted to static structure 66, which, in this example, is a portion of a mid-turbine frame static structure that is axially between the HPT 54 and the LPT 46 (see FIG. 1). In one disclosed non-limiting embodiment, the static structure 66 includes a radial wall 68 with an axial flange 70. It should be appreciated, however, that the static structure 66 may be of various alternative geometries.

The multiple of apertures 88 within the radial flange 84 of the spring 62 receive the respective multiple of fasteners 72 to fasten the spring 62 to the static structure radial wall 68. In this embodiment, the radial flange 84 is not located at a distal end 89 of the spring 62 such that the distal end 89 may be recessed within the radial wall 68 of static structure 66 to provide additional support.

In this disclosed non-limiting embodiment, the bearing support section 96 of the damper 64 is radially inboard of the axial flange 70 such that the bearing support section 96, the radial flange 84 and the rolling elements 74 may be generally axially aligned along the axis R. It should be appreciated that the rolling elements 74 may have some axial variability and that other contemplated configurations need not align each of the components align the axis R.

The spring 62 is mounted to the radial wall 68 by the multiple of fasteners 72, while the damper 64 is at least partially radially supported by the axial flange 70 to support the bearing 60 and, in turn, the outer shaft 50 to meet desired rotor dynamics stiffness requirements. It should be appreciated that the bearing support section 96 may alternatively integrally form the outer race 78. The bearing system 38A thereby absorbs rotor motion associated with non-synchronous vibration through an axially compact assembly.

The static structure 66 may further include internal oil distribution flow passages 98 to direct oil into an annulus 100 formed between the axial flange 70 and an outer diameter 102 of the bearing support section 96. The annulus 100 may be defined by various geometries to include, but not limited to, sealing rings 106 located within lands 104 in the outer diameter 102. Oil is thereby contained in the annulus 100 formed between the sealing rings 106, an inner diameter 108 of the axial flange 70 and the outer diameter 102 of the bearing support section 96 such that the oil may function as a fluid damper to damp the bearing 60 with respect to the axial flange 70.

The bearing support section 96 further includes a land 110 to receive a retaining ring 112 that operates to axially retain the bearing 60. It should be appreciated that various other axial interfaces may be utilized.

Figure 8:
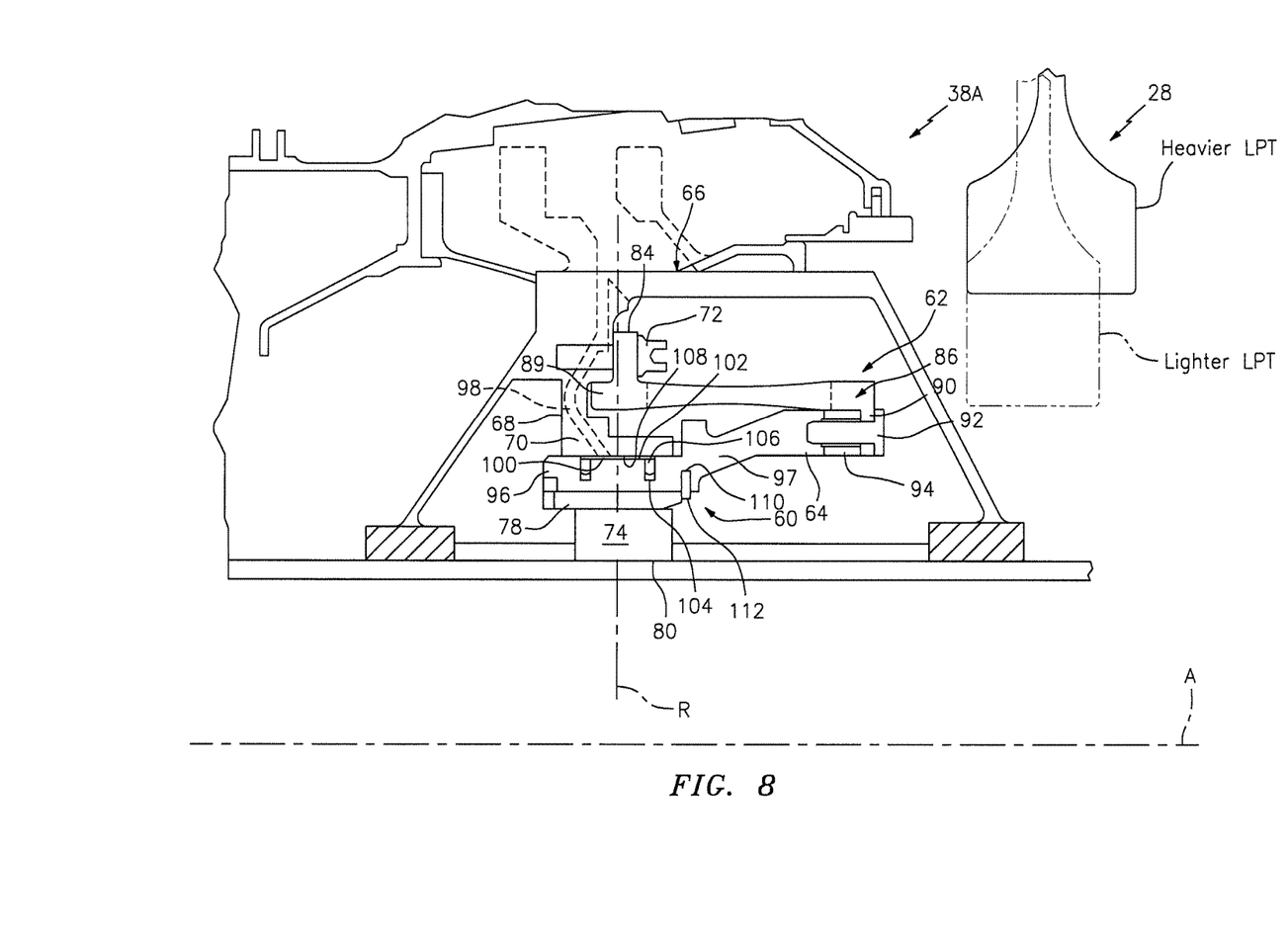
FIG. 8 is an enlarged schematic sectional view of a section of the gas turbine engine with the spring and damper assembly with respect to a first stage low pressure turbine (LPT) rotor illustrating the smaller bore diameter and thereby reduced weight thereof, according to a non-limiting embodiment.

The spring 62 and the damper 64 are readily fastened together in a nested arrangement to provide an axially and radially compact assembly that does not sacrifice the length of beams 82. This facilitates an axially short bearing compartment, which in turn allows a first LPT disk bore (see FIG. 8) to be radially smaller. The radially smaller LPT disk bore which extends closer to axis A thereby results in a lighter weight spool as compared to a spool with a relatively larger disk bore to provide overall engine weight reduction. The separate spring 62 and the damper 64 also facilitate a relatively less complicated manufacture process that increases design flexibility for the nested overlap.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the features within Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A bearing system for a gas turbine engine, comprising:
a spring defined about an axis, the spring including a multiple of beams that extend between a radial flange and a damper attachment;
a damper defined about the axis, the damper fastened to the damper attachment and nested within the spring; and
a bearing mounted to the damper, wherein a bearing element of the bearing is axially aligned with the radial flange.

2. The bearing system as recited in claim 1, further comprising a multiple of fasteners that mount the spring to the damper at the damper attachment.

3. The bearing system as recited in claim 1, wherein the spring is welded to the damper at the damper attachment.

4. The bearing system as recited in claim 1, wherein the radial flange extends radially outboard with respect to the axis.

5. The bearing system as recited in claim 4, wherein the damper attachment extends radially inboard with respect to the axis of rotation.

6. The bearing system as recited in claim 1, wherein the damper defines a bearing support section radially inboard of the radial flange.

7. The bearing system as recited in claim 1, wherein the damper at least partially axially overlaps the multiple of beams.

8. A gas turbine engine, comprising:
- a spring defined about an axis, the spring including a multiple of beams that extend between a radial flange and a damper attachment, the radial flange mounted to a static structure;
- a damper defined about the axis, the damper fastened to the damper attachment and nested within the spring; and
- a bearing mounted between the damper and a rotor shaft to rotationally support the rotor shaft;
- wherein the static structure includes a radial wall with an axial flange, the radial flange mounted to the radial wall; and
- wherein a bearing element of the bearing is axially aligned with the radial flange.

9. The gas turbine engine as recited in claim 8, wherein the damper defines a bearing support section radially inboard of the radial flange.

10. The gas turbine engine as recited in claim 8, wherein the axial flange extends between the spring and the damper.

11. The gas turbine engine as recited in claim 8, wherein the radial flange extends radially outboard with respect to the axis.

12. The gas turbine engine as recited in claim 11, wherein the damper attachment extends radially inboard with respect to the axis of rotation.

13. A gas turbine engine, comprising:
- a spring defined about an axis, the spring including a multiple of beams that extend between a radial flange and a damper attachment, the radial flange mounted to a static structure;
- a damper defined about the axis, the damper fastened to the damper attachment and nested within the spring;
- a bearing mounted between the damper and a rotor shaft to rotationally support the rotor shaft; and
- a multiple of fasteners that mount the damper to the spring at the damper attachment, the multiple of fasteners mounted into a distal end of the damper.

14. A gas turbine engine, comprising:
- a spring defined about an axis, the spring including a multiple of beams that extend between a radial flange and a damper attachment, the radial flange mounted to a static structure;
- a damper defined about the axis, the damper fastened to the damper attachment and nested within the spring; and
- a bearing mounted between the damper and a rotor shaft to rotationally support the rotor shaft;
- wherein the damper attachment and the spring define an interference fit.

\* \* \* \* \*

UNITED STATES PATENT AND TRADEMARK OFFICE
CERTIFICATE OF CORRECTION

PATENT NO. : 10,138,757 B2
APPLICATION NO. : 14/910829
DATED : November 27, 2018
INVENTOR(S) : Witlicki et al.

It is certified that error appears in the above-identified patent and that said Letters Patent is hereby corrected as shown below:

In the Claims

Column 6, Line 51, please delete "hearing" and insert --bearing--.

Signed and Sealed this
Eleventh Day of June, 2019

Andrei Iancu
*Director of the United States Patent and Trademark Office*